United States Patent [19]

Tanner

[11] Patent Number: 5,450,329
[45] Date of Patent: Sep. 12, 1995

[54] VEHICLE LOCATION METHOD AND SYSTEM

[76] Inventor: Jesse H. Tanner, 361 Taylor Ave. NW., Renton, Wash. 98055

[21] Appl. No.: 178,397

[22] Filed: Dec. 22, 1993

[51] Int. Cl.$^6$ .......................... G08G 5/04; H04B 7/185
[52] U.S. Cl. ....................... 364/449; 364/451; 364/461; 342/357; 342/29; 342/455; 340/973; 340/993
[58] Field of Search ............... 364/449, 451, 452, 459, 364/460, 461, 462; 340/990, 991, 993, 901, 903, 902, 973, 981; 342/29, 32, 64, 455, 357; 395/124, 125, 127

[56] References Cited

U.S. PATENT DOCUMENTS

| | | | |
|---|---|---|---|
| 3,573,818 | 4/1971 | Tonawonda et al. | 343/6.5 |
| 3,808,598 | 4/1974 | Carter | 343/112 TC |
| 3,947,845 | 3/1976 | Lyon | 343/6.5 LC |
| 4,063,244 | 12/1977 | Van de Kop | 343/105 R |
| 4,380,050 | 4/1983 | Tanner | 364/461 |
| 4,674,051 | 6/1987 | Fischer | 364/443 |
| 4,710,774 | 12/1987 | Gunny | 342/455 |
| 4,812,990 | 3/1989 | Adams et al. | 364/444 |
| 4,835,537 | 5/1989 | Manion | 342/30 |
| 4,928,107 | 5/1990 | Kuroda et al. | 342/357 |
| 5,032,845 | 7/1991 | Velasco | 342/457 |
| 5,045,860 | 9/1991 | Hodson | 342/451 |
| 5,119,102 | 6/1992 | Barnard | 342/357 |
| 5,153,836 | 10/1992 | Fraughton et al. | 346/461 |
| 5,181,027 | 1/1993 | Shafer | 340/961 |
| 5,202,829 | 4/1993 | Geier | 364/449 |
| 5,208,591 | 5/1993 | Ybarra et al. | 340/961 |
| 5,214,757 | 5/1993 | Mauney et al. | 395/161 |
| 5,225,842 | 7/1993 | Brown et al. | 342/357 |

Primary Examiner—Kevin J. Teska
Assistant Examiner—Tan Nguyen
Attorney, Agent, or Firm—Seed and Berry

[57] ABSTRACT

A vehicle location system and method whereby the position coordinates of a vehicle are made available to other vehicles or to fixed locations by transmission of a data message containing position coordinates of the vehicle. The time slot in which the data message is transmitted is uniquely assigned to each transmitting vehicle as a function of its position in a grid segment with respect to a reference waypoint assigned to that grid segment. Position information in latitude and longitude is provided to each receiving vehicle, together with a precise timing signal, by the Global Positioning System (GPS), or by the Global Orbiting Navigational Satellite System (GLONASS), or by both systems. A synthetic latitude function and a synthetic longitude function provide a periodic mapping of a specific time period onto areas represented by grid segments charted on the global surface. These synthetic functions are initiated and controlled by the precise timing signal from the GPS or GLONASS systems. Each grid segment is assigned a reference waypoint at the northernmost and westernmost point of the grid segment. The vehicle's position in a grid segment with respect to the reference waypoint of that grid segment is determined mathematically. The vehicle's relative position in the grid segment is then correlated to the time mapping of the grid segment provided by the synthetic functions. The vehicle transmits its data message during the mapped time slot corresponding to its position within a grid segment.

37 Claims, 7 Drawing Sheets

VEHICLE LOCATION METHOD AND SYSTEM

TECHNICAL FIELD

This invention relates to systems and methods for providing and displaying vehicle collision avoidance information.

BACKGROUND OF THE INVENTION

Various prior systems provide information about the relative positions of aircraft in a particular airspace.

One system has ultra-precise, airborne clocks aboard each aircraft to provide precise synchronizing reference signals, and each aircraft is prompted to simultaneously transmit an identification signal. Distance between aircraft is determined by measurement of the elapsed time between the transmission of an identification signal and receipt of that signal. This system provides only distance information and does not provide relative bearing or position information. It is readily appreciated that maintenance of all of the ultra-precise, airborne clocks is difficult. All of the aircraft within an airspace transmit identification signals at the same time, causing interference and confusion so that the ability of this type of system to resolve one signal from a large number of other signals is limited.

Another system uses a cooperative interrogation and reply technique whereby an interrogating aircraft transmits a signal and measures the elapsed time between the transmission of the signal and the receipt of a reply signal from a responding aircraft. The ability of the system to resolve the signals from each of a large number of aircraft occupying the same airspace is also limited.

A system whereby each aircraft carries its own expensive scanning radar system obviously presents problems of economics, not to mention the severe clutter and jamming caused by a large number of such systems operating within the same airspace.

Another system uses ground-based radar for determining the position of all aircraft within an airspace and transmits positional data to each aircraft by means of ground-based data transmission links. This system requires radar and data processing facilities which are not available in every geographic area.

Many of the prior location systems have nearly simultaneous signal transmissions from all the aircraft within a given airspace and create serious clutter and jamming problems when a large number of aircraft are present. It is recognized that conventional automatic direction finder systems and range measurement systems, such as the well-known VOR-DME and VOR-TACAN systems, enable an aircraft to accurately know its own angular bearing, or azimuth, and range with respect to a reference location. Many hyperbolic navigation systems, such as LORAN and DECCA, as well as various satellite-based systems, provide individual aircraft and other aircraft with their own positions. However, these systems do not provide an aircraft with information about the position of other aircraft in the same airspace so that collisions may be avoided.

One prior art system designed to overcome many of the problems of the prior art can be found in U.S. Pat. No. 4,380,050, issued to Tanner. The Tanner patent is directed to a collision avoidance system that assigns time slots based on the relative azimuth and range of an aircraft with respect to a local ground-based VOR station. Each aircraft transmits a signal identifying its relative position with respect to the location of the VOR station. The system disclosed in the Tanner patent effectively avoids collisions, but requires other aircraft to convert the relative position signals into global position information such as latitude and longitude.

SUMMARY OF THE INVENTION

It is therefore an object of this invention to provide an improved aircraft location system by which position information for all aircraft within an airspace is economically made available for display on board other aircraft and to fixed monitoring and control locations, It is another object of this invention to provide a collision avoidance warning system for aircraft having conventional systems that determine the aircraft's positions in the airspace, It is another object of this invention to provide a passive airspace surveillance system for ground based air traffic control purposes, It is another object of this invention to provide a ground monitoring and traffic control system for aircraft on the surface of an airport, It is another object of this invention to provide an improved ship location system by which position information for all ships is economically made available for display on board other ships and at fixed monitoring locations, It is another object of this invention to provide a collision avoidance warning system for ships having conventional systems that determine the ships' positions on the surface, It is another object of this invention to provide an improved vehicle location system by which position information for trains and other surface vehicles is economically made available for display on board other vehicles and at fixed monitoring locations.

It is another object of this invention to provide a collision avoidance warning system for surface vehicles having conventional systems that determine the vehicles' positions on the surface.

It is another object of this invention to provide a motor vehicle location system by which position information for all equipped motor vehicles is made available for display at fixed monitoring and control locations.

These and other objects are accomplished by a vehicle location and collision avoidance system of the present invention. Vehicle position information in latitude and longitude is provided to each receiving vehicle, together with a precise timing signal, by an existing satellite positioning system. A synthetic latitude function (y coordinate axis) and a synthetic longitude function (x coordinate axis) provide a periodic mapping of a specific time period onto areas represented by grid segments charted on the global surface. These synthetic functions are initiated and controlled by the precise timing signal from the satellite position system, and provide correlation between relative position and time slot mapping. Each grid segment is assigned a reference waypoint preferably originating at the northernmost and westernmost point of the grid segment, and extending skyward from that point. Using the position data in latitude and longitude supplied by the satellite positioning system, the vehicle's relative position in a grid segment with respect to the reference waypoint of that grid segment is determined mathematically. The vehicle's relative position in the grid segment is correlated to the time mapping of the grid segment provided by the synthetic functions. The vehicle transmits a digitally encoded data message during the corresponding mapped time slot of the grid segment. Since this time slot is uniquely assigned to the vehicle, interference caused by simultaneous transmissions from other vehicles is avoided. While the relative position within a grid segment is used to assign the transmission time slot, it is not the position data that is transmitted in the data message. Actual position data in latitude and longitude obtained from the satellite positioning system is transmitted in the data message. These data are used to provide input to position displays and in cases where the vehicles are aircraft, to collision warning devices. In an alternate embodiment, a third axis representing altitude is used to create a three dimensional mapping of time slots over the volume of a grid segment.

DETAILED DESCRIPTION OF THE INVENTION

Figure 1:
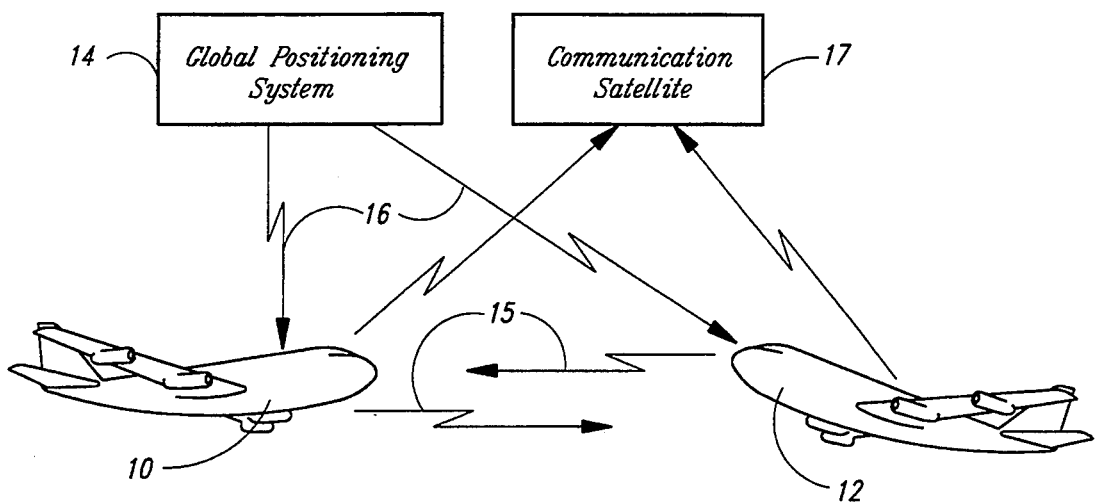
FIG. 1 is a pictorial representation of aircraft using a system according to the invention.

A preferred embodiment of the invention is directed to a vehicle location and collision avoidance system and method whereby an aircraft or other vehicle sends a digitally encoded data message to other aircraft or vehicles and to ground receiving locations during a uniquely defined time slot. The data message preferably includes position coordinates and other appropriate information, such as altitude, vehicle type, speed, and heading. The vehicle receives latitude and longitude coordinates of its position, together with a precise timing signal, from an existing satellite positioning system such as the Global Position System (GPS) or the Global Orbiting Navigational Satellite System (GLONASS). The acronym GPS will be used hereinafter to mean either or both of these systems, or any successor systems, including differential GPS. The vehicle location system uses the position information to create the unique time slot for each vehicle position.

The vehicle location system includes a charting system that divides all or part of the entire global surface into grid segments having predetermined dimensions in latitude and longitude, measured in degrees, minutes, and seconds, or subdivisions thereof. This charting system is based on a reference frame used by the GPS known as the World Geodetic System 1984 (WGS 84), developed by the Defense Mapping Agency, United States Department of Defense. The vehicle location system assigns a reference waypoint to each grid segment at a predetermined surface location within the grid segment, extending skyward from that point. A latitude generator aboard each aircraft or vehicle generates synthetic latitude functions, time mapped onto each grid segment in accordance with a predetermined time period and sequence. A longitude generator aboard each aircraft or vehicle generates synthetic longitude functions, time mapped onto each grid segment in accordance with a predetermined time period and sequence. An altitude generator aboard each aircraft generates synthetic altitude functions, time mapped onto each grid segment in accordance with a predetermined time period and sequence.

The vehicle location system includes a positioning receiver that receives information identifying the position of the vehicle from the GPS. A conversion system converts the position information and altitude to relative position information identifying the vehicle's position with respect to the reference waypoint of the grid segment. A controller correlates the relative position within a grid segment with the synthetic latitude, longitude and altitude functions, and assigns a unique time slot to an aircraft or vehicle based upon its relative position within the grid segment. A transmitter transmits a digitally encoded data message containing position and other appropriate information within the assigned time slot. Preferably, the charting system; latitude, longitude, and altitude generators; conversion system; and controller are software programs executed by a microcomputer aboard each vehicle.

FIG. 1 pictorially represents a parent aircraft 10 and a target aircraft 12 in an airspace covered by a conventional GPS system 14. The aircraft use position signals 15 received from the GPS as shown so that each aircraft 10, 12 knows its own latitude and longitude. Aircraft data messages 16 provided accorded to the invention are shown passing between the aircraft and provide each aircraft with the other aircraft's position within the airspace and other appropriate information, such as altitude, vehicle type, speed, and heading. The transmissions occur at unique time slots to avoid interference. It should be noted that the present invention is not limited to aircraft or aircraft-related systems, but may also include automobiles, boats, spacecraft, and other navigable vehicles. The data messages can be passed directly between the aircraft or via a conventional communication satellite 17.

Differences between the various embodiments discussed herein relate mainly to different system parameters required by the physical environment in which the embodiment will be used and the need for different accuracies and scanning speeds for the described uses. The basic concepts of grid segment mapping, shown in FIGS. 4, 5, 7, and 8, are the same for all embodiments.

Figure 2:
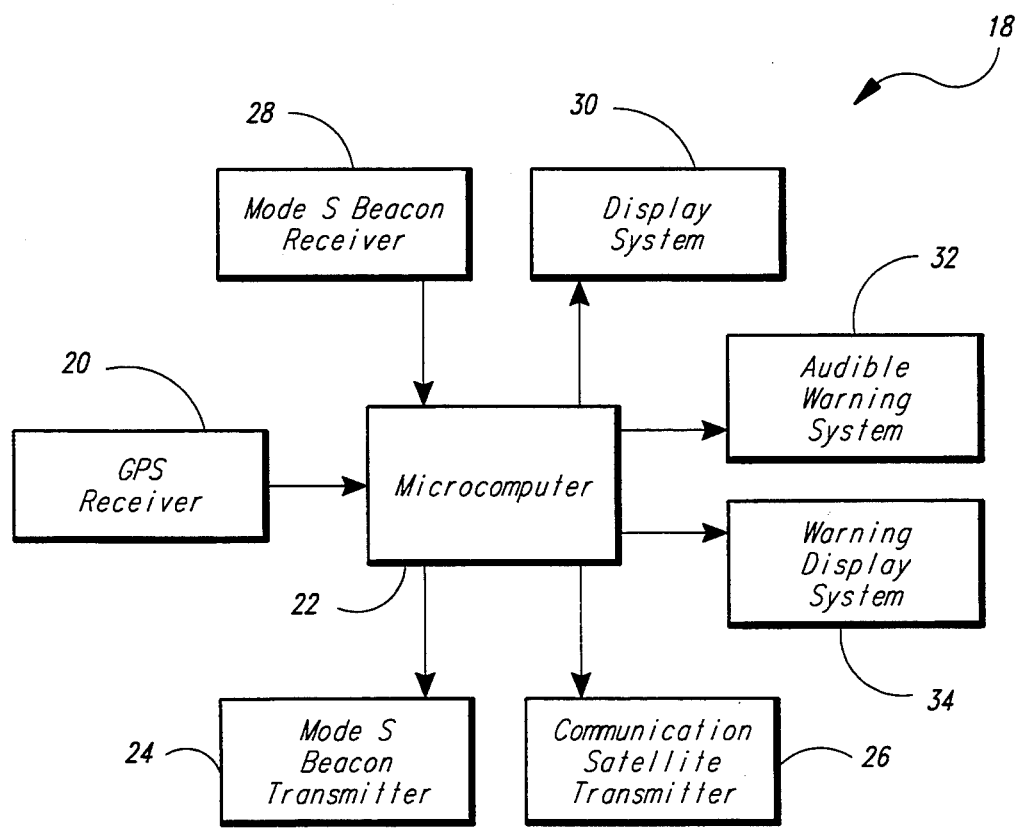
FIG. 2 is a block diagram of a system for receiving and transmitting location and other information according to the invention.

Shown in FIG. 2 is a vehicle location and collision avoidance system 18 according to a preferred embodiment of the present invention. The system 18 includes a global positioning system (GPS) receiver 20 that receives signals from three or more GPS satellites (not shown), each signal including a precise timing value, from which the GPS receiver calculates the latitude, longitude, and altitude of the vehicle. The GPS receiver 20 passes the vehicle position information and the timing signal to a microcomputer 22. As discussed in more detail below, the microcomputer calculates a unique time slot for the vehicle based on the relative position of the vehicle with respect to a reference waypoint. The microcomputer 22 passes the position information received from the GPS receiver 20 to a beacon transmitter 24 which transmits the position information to other vehicles or to fixed traffic controller stations during the unique time slot calculated by the microcomputer. Where direct communication is possible, traffic control stations equipped with this system can intercept the transmitted data messages and display the positions of the transmitting aircraft, enabling vehicle traffic control. Where direct reception of data messages is not possible, such as on or above remote stretches of ocean, the microcomputer 22 sends the position information to a communications satellite transmitter 26 for transmission to traffic control stations via communications satellites. Discrete channels can be assigned to each separate traffic control area to eliminate transmissions from vehicles outside the traffic control area.

The system 18 includes a beacon receiver 28 that receives position data messages from the fixed ground stations and from other vehicles. These data messages are supplied to the microcomputer 22 which mathematically determines the bearing and distance of all aircraft and/or ground stations from which the data messages are received. The microcomputer 18 provides output signals to a display system 30, which displays the positions of the aircraft and/or ground stations within some predetermined range. If the target aircraft is within a predetermined minimum distance, then the microcomputer triggers an audible warning system 32, causing the warning system to emit an audible warning signal notifying the vehicle pilot or driver of the nearby aircraft. In addition, the microcomputer causes a warning display system 34 to display the bearing, range, and altitude of the target vehicle.

THE FIRST EMBODIMENT

Figure 3:
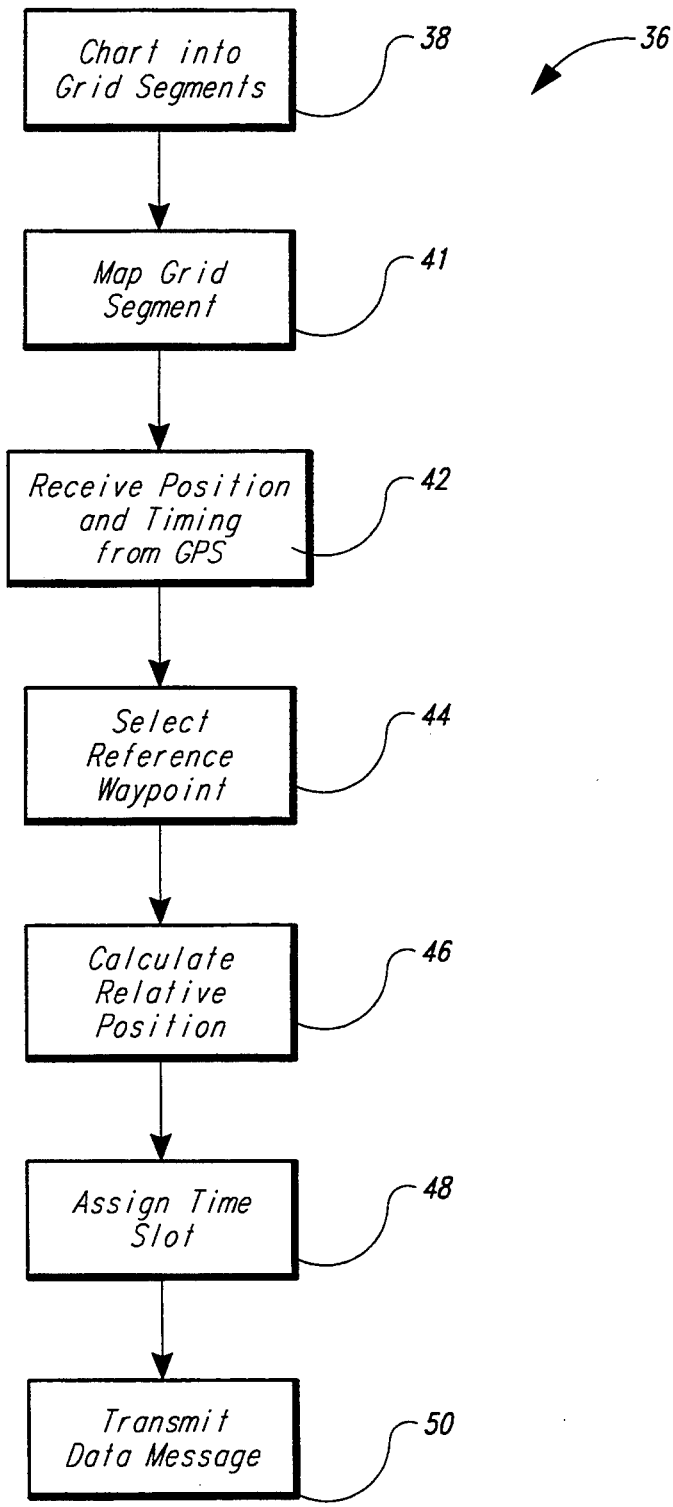
FIG. 3 shows a vehicle location method applicable to all embodiments of the invention.
Figure 4:
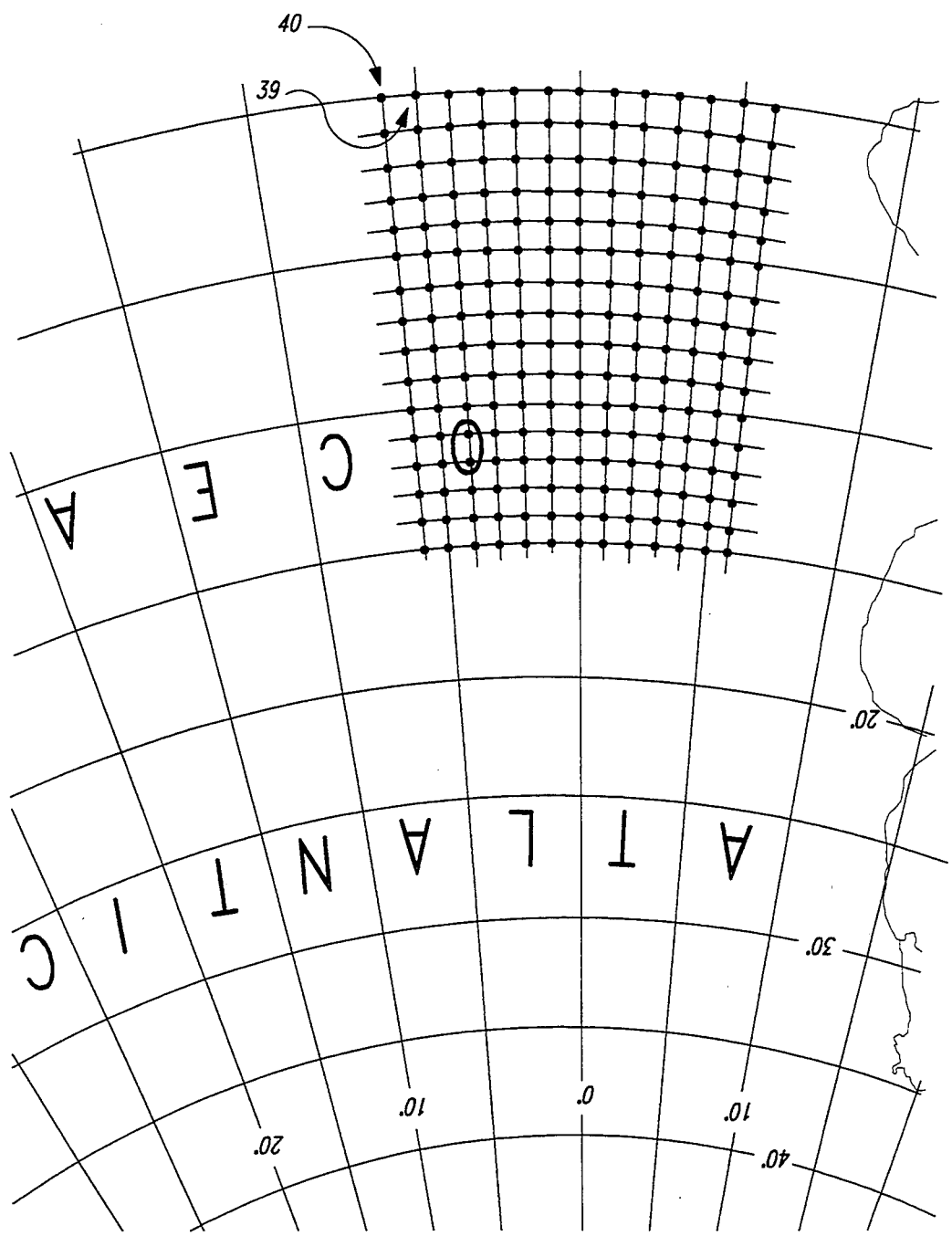
FIG. 4 shows a partial charting of grid segments into the southern hemisphere starting at the equator and at the zero meridian according to the invention.

Shown in FIG. 3 is a vehicle location method 36 according to a first embodiment of the present invention. In step 38 the area in which the vehicle can possibly operate is charted into numerous grid segments 39. In the first embodiment the operating area is the entire surface of the earth, a portion of which is shown in FIG. 4.

Grid segment dimensions are set at one degree per side for this embodiment, although a different dimension may be used. This produces a total of 129600 grid segments 39, starting at the zero meridian of longitude and running eastward and westward to the 180th meridian, and starting at the equator and running northward and southward from the equator to the poles, as illustrated in FIG. 4. The linear distances associated with degrees of latitude remain constant over the global surface but linear distances associated with degrees of longitude decrease for those grid segments charted north and south of the equator. However, the dimensions of each grid segment are constant in degrees, minutes, and seconds of latitude and longitude. Each grid segment dimension in this embodiment can be stated as 1 degree, or 60 minutes, or 3600 seconds of latitude and longitude respectively. Each grid segment is assigned a reference waypoint 40 in latitude and longitude representing the northernmost and westernmost point of the grid segment. A vehicle's position within the grid segment in which it is navigating, relative to the reference waypoint, uniquely assigns the vehicle a time slot in which to transmit.

Time slot dimensions depend on the transmission capability of the data link system used to transmit and receive data packets. For example, the beacon transmitter 24 and the beacon receiver 28 of the present invention use an airborne component of the Air Traffic Control Radar Beacon System/Mode Select (ATCRBS/Mode S), which has a 1 Megabit/sec capacity for transmitting, and its data packet is 112 bits long, plus an 8 usec preamble. This requires a time slot approximately 123 usec long. The total number of time slots depends on the scan time, or the time interval that elapses between an individual aircraft's data packet transmissions. For this embodiment 7 seconds has been selected, although a different scan rate may be chosen. Thus, this embodiment has 1,000,000/123 time slots per second times 7 seconds, or 56,910 time slots.

Figure 5:
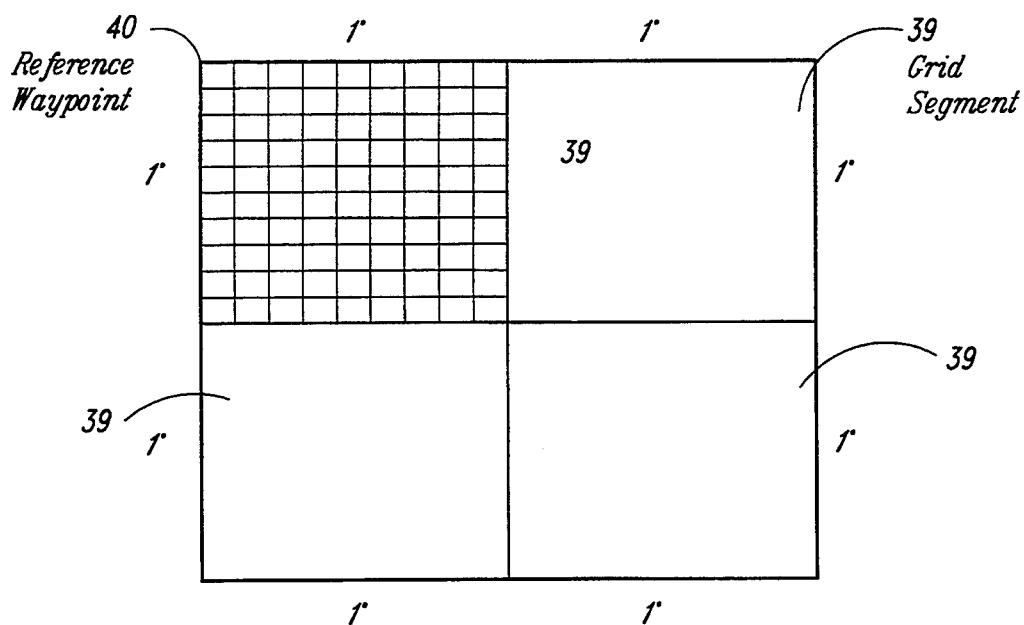
FIG. 5 is a rectangular plot representing the area mapped by a synthetic latitude functiona and a synthetic longitude function according to the invention, and illustrating the charting of the global surface into grid segments.

In step 41 of the method shown in FIG. 3, these time slots are then mapped onto each grid segment 39. The x-axis mapping function is called a synthetic longitude function and the y-axis mapping function is called a synthetic latitude function in this invention. In the interest of symmetry, the time slot mapping onto each grid segment has been selected to be 238 rows by 238 columns per grid segment as shown in FIG. 5. It should be noted that FIG. 5 shows 10 rows and 10 columns, with each row representing 23.8 actual rows and each column representing 23.8 actual columns. Each grid segment is mapped staffing at the reference waypoint and proceeding from left to right by rows. This produces an actual count of 56,644 time slots, each 123.57 usec long. This mapping protocol ensures that the maximum position change required to shift time slots is 1,531.76 feet, or approximately 0.25 nautical miles along either the latitude or the longitude axis. The corresponding latitude or longitude increment required to shift time slots is 15.12 seconds of latitude or longitude (3600 seconds per degree ÷ 238 rows or columns). Different scan rates would require different position changes to shift time slots.

A discussion of the mathematical relationships involved in mapping according to synthetic longitude and latitude functions may be helpful at this point. Consider the area represented by a grid segment, mapped by relative longitude and latitude with respect to a reference waypoint within the grid segment. Consider the same area represented by the same grid segment, mapped by a synthetic longitude and latitude function relative to the same reference waypoint. These synthetic longitude and latitude functions are a scale transformation of the relative longitude and latitude mapping described above, each starting from a common origin.

If x, y respectively represent a vehicle's relative longitude and latitude within a grid segment, with respect to the reference waypoint of that grid segment, and u, v represent the same relative longitude and latitude, transformed by a scale factor, B, to produce the synthetic longitude and latitude functions, the transforming equations can be written as:

$$u = Bx \qquad (1)$$

and, $$v = By \quad (2)$$

As can be seen from equations (1) and (2), the synthetic longitude and latitude mapping functions are correlated to the relative longitude and latitude mapping of a grid segment by the scale factor, B, (238/3600 for the preferred embodiment) in such a manner that a vehicle's relative position uniquely determines a synthetic longitude value and a synthetic latitude value. The reciprocal of the scale factor (3600/238 or 15.12) determines the increment of position change in relative longitude and latitude required to shift one unit on the synthetic longitude or latitude scale.

An additional equation defines the relationship of the synthetic longitude and latitude functions to the real time spectrum as follows:

$$U_{max} V_{max} = \frac{\text{System Scan Time Period}}{\text{Time Required to Transmit a Data Message}} \quad (3)$$

Equation (3) sets the product of the maximum values of the synthetic longitude and latitude functions u, v, to the maximum number of time slots, of the required slot length, that can be accommodated within one system scan time period. A system scan time period is defined as the time period between repetitive cycles through the sequentially mapped time slots.

The time required to transmit a data message is determined by the message length, in bits, and the bit rate transmission capability of the data link system used to transmit the data message. The system scan time period, divided by the length of time required to transmit a single aircraft data message, determines the maximum number of data messages that can be transmitted during one scan time period. This number establishes the maximum number of time slots that can be mapped by the synthetic longitude and latitude functions. If symmetry of the synthetic longitude and latitude functions is desired, then the square root of this number yields the maximum number of units of such synthetic longitude and latitude. This correlation permits the sequential mapping of time slots onto the area represented by the grid segment such that the start of each time slot corresponds to an integral set of synthetic longitude and latitude coordinates and, through the scale factor, also corresponds to a set of relative longitude and latitude coordinates. This correspondence permits the system described in the first embodiment to uniquely assign a time slot to a vehicle occupying the position that corresponds to those coordinates, during which it transmits a data message.

Continuing with the vehicle location method shown in FIG. 3, the longitude and latitude of the vehicle are received from the GPS in step 42. In step 44, the appropriate reference waypoint for a grid segment is selected automatically by the microcomputer 22 using the actual position data obtained from the GPS receiver 20. Preferably, westerly longitude and northerly latitude values contained in position coordinates are rounded up to the next whole degree to find the reference waypoint longitude or latitude value. Easterly longitude and southerly latitude values contained in position coordinates are rounded down to the next whole degree to obtain the reference waypoint longitude or latitude value.

In step 46, the relative position of the vehicle within a grid segment is found by subtracting the actual latitude and longitude of the vehicle's position from that of the reference waypoint of that grid segment, and using the absolute value of the result. Thus, the range of relative latitude and longitude values is 0 to 3600 seconds and is identical for all grid segments. This permits identical time mapping of the synthetic functions on each grid segment, regardless of the grid segments location on the global surface.

A synthetic altitude function, which is a scale transformation of actual altitude, is defined by equation (4) in a manner similar to the synthetic longitude and latitude functions:

$$z = Cw \quad (4)$$

The scale factor, C, transforms actual altitude, w, into the synthetic altitude function, z. For embodiment two, C equals 60/40000. Here, also, the reciprocal of the scale factor determines the increment of altitude change required to change one unit on the synthetic altitude scale. The scale factor, B, used to define the synthetic longitude and latitude functions u, v, for the second embodiment is 80/3600. For three dimensional time mapping, the product of the maximum value of the three functions, u, v, and z is set equal to one system scan time period, divided by the length of time required to transmit one aircraft data message.

$$U_{max} V_{max} Z_{max} = \frac{\text{System Scan Time Period}}{\text{Time Required to Transmit a Data Message}} \quad (5)$$

Equation (5) sets the product of the maximum values of the three synthetic functions u,v,z, equal to the maximum number of time slots that can be accommodated in one system scan time period. Embodiment two employs a scan time period and data link system that provides 400,000 time slots. Dividing this number of time slots by 60 and taking the square root of the quotient produces a 60 unit synthetic altitude function, representing 60 altitude levels up to and including 40,000 feet and above as the final upper level, and symmetrical synthetic longitude and latitude functions of 80 units each, mapping each of these altitude levels. This correlation permits the sequential mapping of the time slots onto the volume over the grid segment such that the start of each time slot corresponds to an integral set of synthetic longitude, latitude, and altitude coordinates and, through the scale factors, also corresponds to a set of relative longitude, latitude, and altitude coordinates. This correspondence permits the system described in embodiment two to uniquely assign a time slot to an aircraft occupying the position that corresponds to those coordinates, during which it transmits a data message.

The latitude synthetic function (y coordinate axis) has 238 rows, each row being 29411.76 usec long. This function preferably is represented in a microcomputer program as a table consisting of 238 addresses, of which the first is set to zero and each successive address contains the sum of the contents of the previous address plus 29411.76. The longitude synthetic function (x coordinate axis) has 238 columns along a row each 123.57 usec wide. This function is represented in a microcomputer program as a table consisting of 238 addresses, of which the first is set to 123.57 and each successive one contains the sum of the contents of the previous address plus 123.57. Each of these tables is entered into at an address calculated by dividing the vehicle's relative latitude in seconds within a grid segment by the increment of latitude required to shift rows, i.e., 15.12 (3600/238), for the latitude table, and its relative longitude in seconds, within a grid segment, by the increment of longitude required to shift columns, or 15.12, for the longitude table. The result in each case, discarding any remainder which selects the time slot at its beginning, will be an integral number ranging from 1 to 238.

In step 48, the microcomputer 22 computes a time slot for the vehicle. The sum of the contents of the selected table addresses of the latitude synthetic function and the longitude synthetic function, discarding any fractional component, represents a mapped time slot within the grid segment and can be used to set a timing counter in microcomputer 22. The countdown of the counter is started simultaneously for all vehicles by the microcomputer 22 using the precise clock synchronizing signal received from the GPS receiver 20. At the expiration of each vehicle's countdown, the microcomputer 22 causes the vehicle, using the Mode S Beacon Transmitter 24, to transmit a data message, previously described, within this uniquely defined time slot (step 50). This occurs repetitively at the scan rate, or once each 7 seconds, for all vehicles. Where scan times are not integrally divisible into 24 hours, such as the 7 second scan for this embodiment, the microcomputer 22 can be programmed to reset the scans for all aircraft to begin at 0000 Greenwich Mean Time, derived from GPS time, by leaping over the fractional scan period. As each vehicle's position changes within the grid segment, the time slot in which it transmits a data message also changes. As long as vehicles are separated from each other by a horizontal distance greater than 0.25 nautical mile along the latitude or longitude axis, there will be no overlap in aircraft transmissions.

For purposes of comparison, if a 1 second scan rate is used in the first embodiment, this allows 8,100 time slots, each 123.45 usec long. The time slot mapping onto each grid segment produces 90 rows by 90 columns per grid segment. Maximum change of position to shift time slots is 4,050.66 feet, or ⅔ nautical mile, along either the latitude or longitude axis. The corresponding increment of latitude and longitude required to shift time slots is 40 seconds of latitude and longitude respectively. The shorter scan rate allows a much more frequent position update, but accomplishes this at the expense of system resolution, or increment of position change required to shift time slots.

On occasion, two vehicles in nearby grid segments or at different altitudes in the same grid segment may occupy the same time slot. However, since time slot assignment changes dynamically based on each vehicle's position relative to its respective reference waypoint, the probability that such conflict will exist for more than one scan is small, even with high densities of vehicles. Computer tracking logic, currently used in ground air traffic control locations, uses position, altitude, speed, and heading data to project a vehicle's track as a function of time, in order to predict position conflicts and potential collisions. This logic can also be used to predict simultaneous vehicle transmissions within the same time slot, since each time slot assignment is a function of a vehicle's position. Each conflicting vehicle's time slot assignment can then be shifted slightly by its tracking logic to prevent this occurrence. Vehicles in grid segments farther away will be outside communication range.

The grid segment time mapping protocol, together with a vehicle's relative position within a grid segment, assigns the time slot during which an aircraft transmits a data message containing position data in latitude and longitude, altitude data (if any), and a vehicle identification code. Other data such as heading and speed may also be transmitted. While the vehicle's relative position with respect to the reference waypoint is used to assign a transmission time slot to the vehicle, this is not the position data that is transmitted to other vehicles and to fixed locations. Actual latitude and longitude obtained from the GPS is transmitted and may then be referred to the waypoints or to any other reference system for display or navigational purposes.

Figure 6:
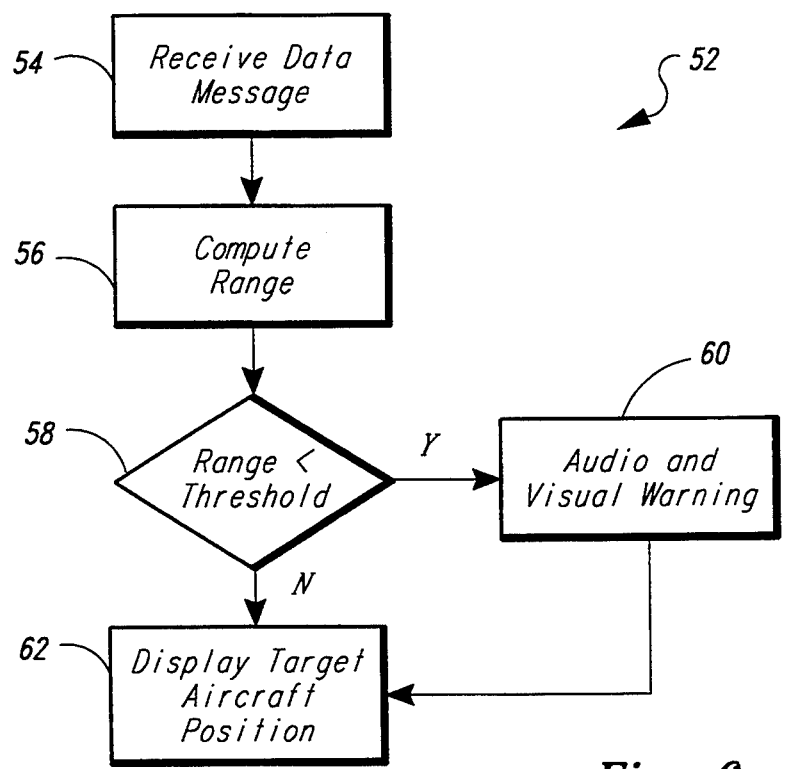
FIG. 6 is a method of computing the hazard of collision, triggering appropriate warnings, and displaying target aircraft according to the invention.

As discussed above, the system 18 shown in FIG. 2 can provide each vehicle with information regarding nearby vehicles in order to avoid collisions. Shown in FIG. 6 is a method 52 used by the system 18 to avoid collisions between vehicles. In step 54 the beacon receiver 28 (FIG. 2) of the parent aircraft 10 (FIG. 1) receives a data message from a target aircraft 12 (FIG. 1). As discussed above, the data message includes the latitude and longitude of the target aircraft and may also include other information such as altitude, bearing, speed, and an aircraft ID. In step 56 the microcomputer 22 of the parent aircraft computes the distance between the parent and target aircraft using the latitude, longitude, and altitude (if any) of the respective aircraft. In step 58 the microcomputer 22 determines whether the target aircraft is within a predetermined threshold distance from the parent aircraft. If so, then in step 60 the microcomputer 22 causes the audible warning system 32 and the warning display system 34 to warn the vehicle pilot or driver of the intruding target aircraft. As discussed above, the warning display system displays the bearing, range, and altitude of the intruding target aircraft. Regardless of whether the target aircraft is within the threshold distance, the microcomputer causes the display system 30 to display the position of the target aircraft in step 62. In an alternate embodiment, the microcomputer 22 can determine whether to issue a warning to the pilot by calculating whether the target aircraft is within a predetermined threshold time from colliding with the parent aircraft. Such a potential collision time can be calculated based on the bearing and speed of the target aircraft in addition to the distance of the target aircraft from the parent aircraft.

The system described above can be used by properly equipped aircraft, ships, trains and other vehicles in an identical manner. Different beacon frequencies will be required to prevent commingling with the vehicle system transmissions, and discrete Communication Satellite channels will be required to transmit position data to the appropriate display locations. Trucks, busses, and automobiles that are properly equipped can also use the system for transmitting location data to a remote display point via a discrete Communication Satellite Channel, however, the beacon transmission would not be required.

THE SECOND EMBODIMENT

In a second embodiment, the vehicle location and collision avoidance system 18 assigns a time slot for each aircraft based on the aircraft's altitude in addition to its latitude and longitude. The hardware used for the second embodiment is the same as that used for the first embodiment (FIG. 2). The GPS receiver 20 calculates the aircraft's altitude, longitude, and latitude from the GPS signals received from the GPS satellites and the microcomputer 22 assigns a time slot for the aircraft based on the aircraft's relative position within a three-dimensional grid segment.

Grid segment charting and reference waypoint assignment for this embodiment is identical to that of the first embodiment. A third axis (z coordinate axis) representing altitude can be added to the invention if the data link transmission rate is improved or if longer scan time periods are used. In this embodiment the airborne beacon transmission capability is increased to 4 Mbit/Sec, comparable to the ground transmitter component of the Mode S beacon system, and the scan time is increased to 12 seconds. Transmitting a 112 bit data packet plus a 2 usec preamble at this higher bit rate requires a time slot length of approximately 30 usec. Dividing one scan time interval by 30 usec produces 400,000 time slots. These time slots are mapped to the three coordinates in a manner that ensures that the horizontal position change required to shift time slots is minimized, and the vertical position change required to shift time slots is less than the altitude separation used for air traffic control. Dividing this total number of time slots by 60 and allocating the 60 slices to the volume over the grid segment, produces 60 altitude bands each containing 6,666 time slots. Each of these bands represents a 666.67 foot altitude increment, and, in this embodiment, the altitude synthetic function is mapped to 40,000 feet. The latitude and longitude coordinates are chosen as 80 by 80 for symmetry. The resulting time mapping of coordinates is then 80 by 80 by 60 which produces 384,000 time slots, each 31.25 usec long. The position change required to shift time slots is 4,557 feet or approximately 0.75 nautical mile along either the latitude or longitude axis, or 666.67 feet of altitude change along the altitude axis. Corresponding changes of latitude and longitude to shift time slots is 45 seconds of latitude or longitude.

In this embodiment, time slot mapping is accomplished starting at the reference waypoint at the surface, mapping from left to right by rows, and after each altitude band is mapped, moving up 666.67 feet to the next altitude band and repeating the same sequence until the volume above the grid segment is mapped up to 40,000 feet. All of the few aircraft able to fly above 40,000 feet will be assigned 40,000 feet of altitude when flying above that level for purposes of time slot assignment.

The appropriate reference waypoint for a grid segment is selected automatically by the microcomputer 22 using the aircraft's actual position data obtained from the GPS Receiver 20. As in the first embodiment, westerly longitude and northerly latitude values contained in position coordinates are rounded up to the next whole degree to find the reference waypoint longitude or latitude value. Easterly longitude and southerly latitude values contained in position coordinates are rounded down to the next whole degree to obtain the reference waypoint longitude or latitude value.

Relative position within a grid segment is found by subtracting the actual latitude and longitude of the aircraft's position from that of the reference waypoint of that grid segment, and using the absolute value of the result. Thus, the range of relative latitude and longitude values is 0 to 3600 seconds and is identical for all grid segments. This permits identical time mapping of the synthetic functions on each grid segment, regardless of the grid segments location on the global surface.

The latitude synthetic function (y coordinate axis) has 80 rows each 2500 usec long. This function can be represented in a microcomputer program as a table consisting of 80 addresses, of which the first is set to zero and each successive one contains the sum of the contents of the previous address plus 2500. The longitude synthetic function (x coordinate axis) has 80 columns along a row each 31.25 usec wide. This function can be represented in a microcomputer program as a table consisting of 80 addresses, of which the first is set to 31.25 and each successive one contains the sum of the contents of the previous address plus 31.25. Each of these tables is entered into at an address calculated by dividing the aircraft's relative latitude in seconds, within a grid segment, by the increment of latitude required to shift rows, or 45, for the latitude table, and its relative longitude in seconds, within a grid segment, by the increment of longitude required to shift columns, or 45, for the longitude table. The result in each case, discarding any remainder which selects the time slot at its beginning, will be an integral number ranging from 1 to 80. The altitude synthetic function (z coordinate axis) has 60 levels, each encompassing 200,000 usec of the scan time period. This function can be represented in a microcomputer program as a table consisting of 60 addresses, of which the first is set to zero and each successive one contains the sum of the contents of the previous address plus 200,000. This table is entered into at an address calculated by dividing the aircraft's altitude, provided by the GPS, by 666.67, the altitude increment of change required to shift time slots. The result, discarding any remainder which selects the altitude level at its beginning, will be an integral number ranging from 1 to 60.

The sum of the contents of the selected table addresses of the latitude synthetic function, the longitude synthetic function, and the altitude synthetic function, discarding any fractional component, represents a mapped time slot within the grid segment volume and can be used to set a timing counter in the microcomputer 22. The countdown of the counter is started simultaneously for all aircraft within the airspace by the microcomputer 22 using the precise clock synchronizing signal received from the GPS receiver 20. At the expiration of each aircraft's countdown, the microcomputer 22 causes the aircraft, using the beacon transmitter 24, to transmit a data message, previously described, within this uniquely defined time slot. This occurs repetitively at the scan rate or, once each 12 seconds for all aircraft. As each aircraft's position changes within the grid segment volume, the time slot in which it transmits a data message also changes. As long as aircraft are separated from each other by a distance greater than 0.75 nautical mile along the latitude or longitude axis, or by an altitude greater than 666.67 feet, there will be no overlap in aircraft transmissions.

THE THIRD EMBODIMENT

Figure 7:
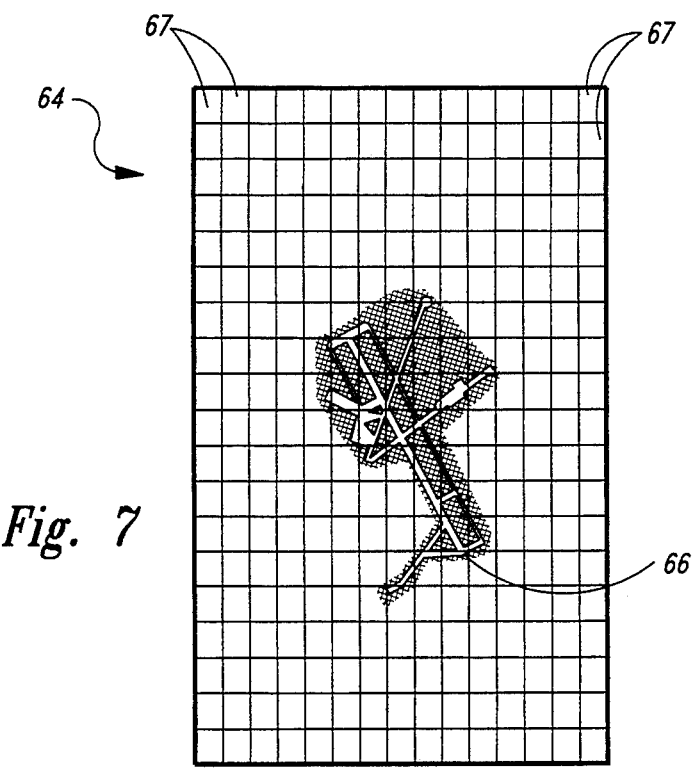
FIG. 7 is a rectangular plot illustrating the charting of an airport surface into grid segments according to the invention.

A smaller scale charting of grid segments onto an airport area can be used to show the ground location of aircraft on the airport surface and such information can be provided to other aircraft for display, and to the control tower for display and control of aircraft ground movements. A separate beacon transmitter and receiver frequency will be required, to which all aircraft would be directed to switch, upon landing or upon pushback from the terminal, to prevent interference with the airborne system previously described. Shown in FIG. 6 is an airport area 64 six minutes of latitude by six minutes of longitude, the boundaries of which are coincident with integral minutes of latitude and longitude. Of course, different dimensions could be used to map different areas. This area is centered on an airport 66, as precisely as possible, and divided into grid segments 67 of 20 seconds of latitude by 20 seconds of longitude. This will produce 324 small scale grid segments as shown in FIG. 7. Small scale charting together with a very short scan rate is required due to the close proximity of aircraft on an airport. A 1-second scan time is selected for this embodiment.

The data being transmitted in this embodiment is an aircraft identifier and position coordinates. A reasonable time slot length of 123 usec. is selected. Using the bandwidth of the airborne beacon transmitter 24 (FIG. 2), the number of time slots possible for a one second scan rate is 1,000,000/123 or 8,130. Here also, for purposes of symmetry, the time slot mapping onto each grid segment has been selected to be 90 rows by 90 columns per grid segment. This produces an actual count of 8,100 grid slots, each 123.45 usec long. This mapping protocol ensures that the maximum position change required to shift time slots is 22.5 feet along either the latitude or the longitude axis. The corresponding latitude or longitude increment required to change time slots is 222.22 milliseconds of latitude or longitude. Although different computer program parameters are required, the system functions identically to the airborne system described in the first embodiment and uses the same equipment shown in FIG. 2.

The appropriate reference waypoint for a grid segment is selected automatically by the microcomputer 22 using the aircraft's actual position data obtained from the GPS receiver 20. A protocol for accomplishing this is as follows: westerly longitude and northerly latitude values contained in position coordinates are rounded up to the next whole multiple of 20 seconds to obtain the reference waypoint latitude or longitude value. Easterly longitude and southerly latitude values contained in position coordinates are rounded down to the next whole multiple of 20 seconds to obtain the reference waypoint latitude or longitude value.

Relative position within a grid segment is found by subtracting the actual latitude and longitude of the aircraft's position from that of the reference waypoint of that grid segment, and using the absolute value of the result. Thus, the range of relative latitude and longitude values is 0 to 20 seconds and is identical for all grid segments. This permits identical time mapping of the synthetic functions on each grid segment, regardless of the grid segments location in the area charted around the airport.

The latitude synthetic function (y coordinate axis) has 90 rows each 11,111.11 usec long. This function can be represented in a microcomputer program as a table consisting of 90 addresses, of which the first is set to zero and each successive one contains the sum of the contents of the previous address plus 11,111.11. The longitude synthetic function (x coordinate axis) has 90 columns along a row each 123.45 usec wide. This function can be represented in a microcomputer program as a table consisting of 90 addresses, of which the first is set to 123.45 and each successive one contains the sum of the contents of the previous address plus 123.45. Each of these tables is entered into at an address calculated by dividing the aircraft's relative latitude in milliseconds, within a grid segment, by 222.22, for the latitude table, and its relative longitude in milliseconds, within a grid segment, by 222.22, for the longitude table. The result in each case, discarding any remainder which selects the time slot at its beginning, will be an integral number ranging from 1 to 90.

The sum of the contents of the selected table addresses of the latitude synthetic function and the longitude synthetic function, discarding any fractional component, represents a mapped time slot within the grid segment and can be used to set a timing counter in the microcomputer 22. The countdown of the timing counter is started simultaneously for all aircraft on the airport by the microcomputer 22 using the precise clock synchronizing signal received by the GPS receiver 20. At the expiration of each aircraft's countdown, the microcomputer 22 causes the aircraft, using its beacon transmitter 24, to transmit its aircraft ID and position coordinates, within its uniquely defined time slot. This occurs repetitively at the scan rate or, once each second for all aircraft on the airport surface. As each aircraft's position changes within the grid segment, the time slot in which it transmits data also changes.

Each receiving aircraft and the air traffic control tower of the airport receive the data messages by way of its respective beacon receiver 24. These data messages are supplied to the microcomputer 22 which mathematically determines the bearing and distance of all aircraft from which data messages are received. The microcomputer 22 causes the display system 30, to display the position of all aircraft from which messages are received, permitting pilots to know the position of all moving aircraft on the airport and permitting the control tower to control the movement of aircraft on the airport.

THE FOURTH EMBODIMENT

Figure 8:
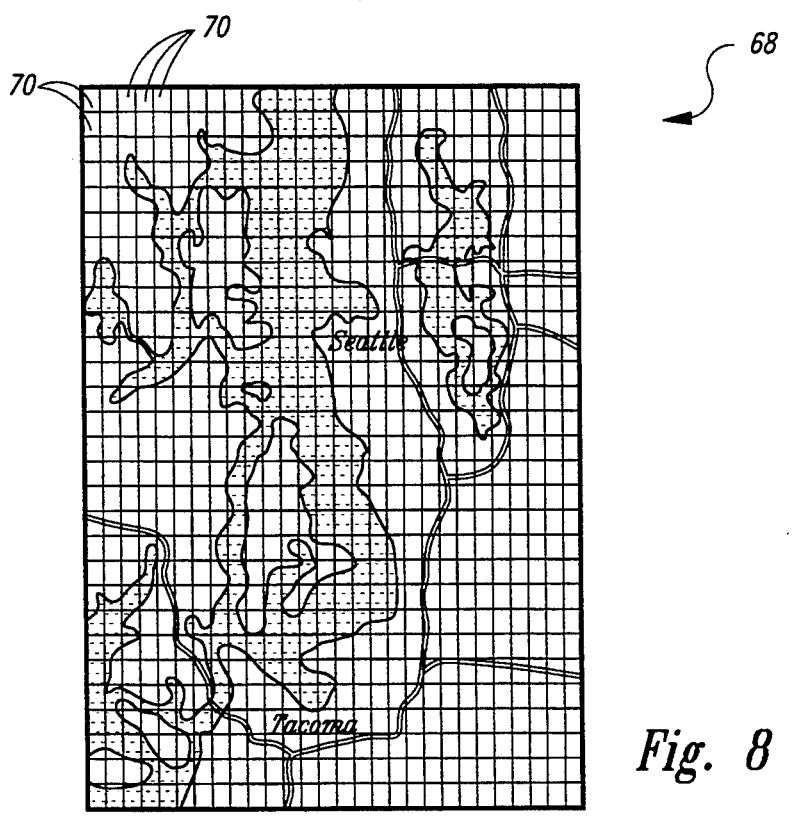
FIG. 8 is a rectangular plot illustrating the charting of a city, county, or other political subdivision into grid segments according to the invention.

A smaller scale charting of grid segments onto an area, such as a city or a county, or other political subdivision, can be used to show the location of police and emergency vehicles and such information can be provided to a fixed control point for display and control of vehicle movements. Shown in FIG. 8 is a metropolitan area 68 thirty minutes of latitude by 30 minutes of longitude, the boundaries of which are coincident with integral minutes of latitude and longitude. However, different dimensions could be used. This area is centered on the city or county, as precisely as possible, and divided into grid segments of 1 minute of latitude by 1 minute of longitude, thereby producing 900 small scale grid segments 70. Small scale charting is necessary to increase position accuracy.

As Vehicle ID and position coordinates are required to be transmitted in this embodiment, a time slot length of 123 usec is selected. Assuming a 1 Mbit/Sec capacity of the Communication Satellite channel, the number of time slots possible for a 90 second scan time is 90,000,000/123 or 731707. Although a 90 second scan time is selected for this embodiment, a shorter scan time could be used for a more rapid position update. Here also, for purposes of symmetry, the time slot mapping onto each grid segment has been selected to be 855 rows by 855 columns per grid segment. This produces an actual count of 731025 grid slots, each 123.11 usec. long. This mapping protocol ensures that the maximum position change required to shift time slots is 7.1 feet along either the latitude or the longitude axis. The corresponding latitude or longitude increment required to change time slots is 70.17 milliseconds of latitude or longitude. Although different computer program parameters are required, the system functions identically to the airborne system described in the first embodiment and uses the same equipment, shown in FIG. 2. However, preferably the ground-based system of the fourth embodiment is isolated from the airborne system of the first embodiment by use of a separate communication satellite transmitter channel or, by use of a broadband ground communication system. Transmission via the beacon transmitter 24 is not required for this embodiment.

The appropriate reference waypoint for a grid segment is selected automatically by the microcomputer 22 using the vehicle's actual position data obtained from the GPS receiver 20. A protocol for accomplishing this is as follows: westerly longitude and northerly latitude values contained in position coordinates are rounded up to the next whole minute to obtain the reference waypoint latitude or longitude value. Easterly longitude and southerly latitude values contained in position coordinates are rounded down to the next whole minute to obtain the reference waypoint latitude or longitude value.

Relative position within a grid segment is found by subtracting the actual latitude and longitude of the vehicles position from that of the reference waypoint of that grid segment, and using the absolute value of the result. Thus, the range of relative latitude and longitude values is 0 to 60,000 milliseconds and is identical for all grid segments. This permits identical time mapping of the synthetic functions on each grid segment, regardless of the grid segments location in the area.

The latitude synthetic function (y coordinate axis) has 855 rows each 105263.15 usec long. This function can be represented in a microcomputer program as a table consisting of 855 addresses, of which the first is set to zero and each successive one contains the sum of the contents of the previous address plus 105,263.15. The longitude synthetic function (x coordinate axis) has 855 columns along a row each 123.11 usec wide. This function can be represented in a microcomputer program as a table consisting of 855 addresses, of which the first is set to 123.11 and each successive one contains the sum of the contents of the previous address plus 123.11. Each of these tables is entered into at an address calculated by dividing the vehicles relative latitude in milliseconds, within a grid segment, by 70.17, for the latitude table, and its relative longitude in milliseconds, within a grid segment, by 70.17, for the longitude table. The result in each case, discarding any remainder which selects the time slot at its beginning, will be an integral number ranging from 1 to 855.

The sum of the contents of the selected table addresses of the latitude synthetic function and the longitude synthetic function, discarding any fractional component, represents a mapped time slot within the grid segment and can be used to set a timing counter in the microcomputer 22. The countdown of the timing counter is started simultaneously for all vehicles within the area by the microcomputer 22 using the precise clock synchronizing signal received from the Global Positioning System 14 by GPS receiver 20. At the expiration of each vehicle's countdown, the microcomputer 22 causes the vehicle, using the communication satellite transmitter 26, to transmit its vehicle ID and position coordinates within its uniquely defined time slot. This occurs repetitively at the scan rate, or once each 90 seconds, for all vehicles within the area. As each vehicle's position changes within the grid segment, the time slot in which it transmits data also changes.

A fixed control station (not shown) receives the data messages by way of a communication satellite receiver similar to the beacon receiver 28 shown in FIG. 2. The control station uses the data contained in the data messages to display the position of all vehicles from which messages are received, permitting the control station to control the movement of vehicles in the area.

THE FIFTH EMBODIMENT

For some applications, such as an aircraft approaching an airport runway, the first through fourth embodiments may not be sufficiently accurate. Such suboptimum accuracy can be caused be many factors, such as atmospheric distortion and military-imposed periodic inaccuracies with the GPS system. The military imposes such inaccuracies to prevent hostile users from using the GPS system to guide missiles launched against U.S. targets. The military does not oppose persons skilled in the art to develop methods to overcome the military-imposed inaccuracies on a local, line-of-sight basis, so that the GPS can be used by commercial aircraft without affecting the military's ability to stop such hostile use. The fifth embodiment discussed herein is such a method that overcomes military-imposed and other inaccuracies and provides a higher degree of accuracy than does standard GPS.

The fifth embodiment is directed to a method and system for providing highly accurate guidance to a vehicle, such as an aircraft approaching an airport runway. In addition, the fifth embodiment calculates a differential GPS correction factor that is used to adjust the vehicle location calculated using the GPS system in the first through fourth embodiments.

Figure 9:
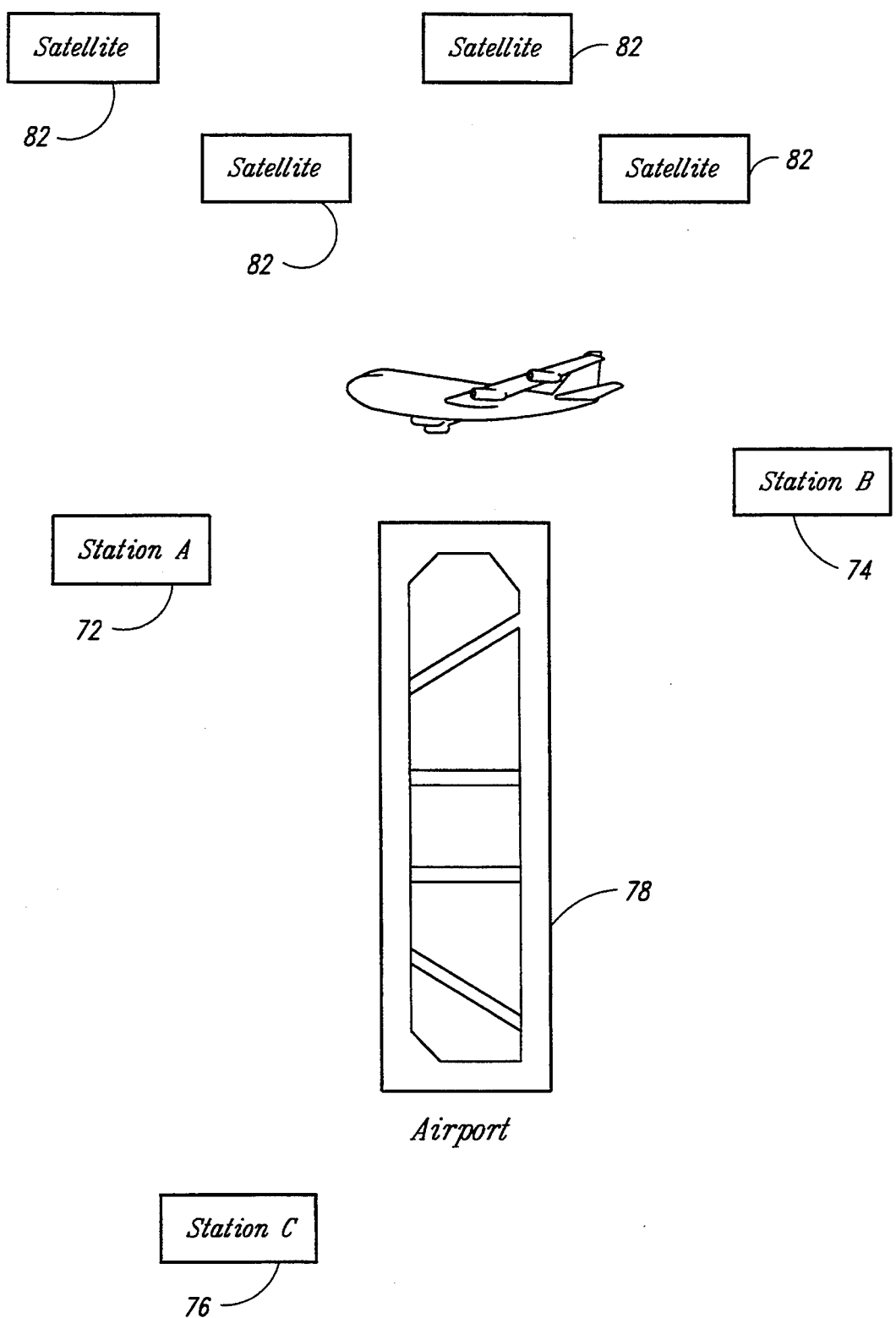
FIG. 9 is a pictorial representation of a fifth embodiment system according to the invention.

The fifth embodiment system includes three ground stations: station A 72, station B 74, and station C 76, located at precisely surveyed positions within an area surrounding an airport 78 as shown in FIG. 9. These stations may be separated by a few miles, up to tens of miles, but should be located so as to provide a good Position Dilution of Precision (PDOP) to an aircraft 80 on approach to any runway on the airport. Three is the minimum number of stations that will provide three dimensional position coordinates to a receiving aircraft, however only one station is required for differential corrections of ranges. Like the other embodiments, the fifth embodiment uses the GPS system which includes a set of 24 navigational satellites 82 spaced above the surface of the earth. The differential correction method will be described first, followed by the method of providing terminal guidance to an aircraft on approach to an airport.

Figure 10:
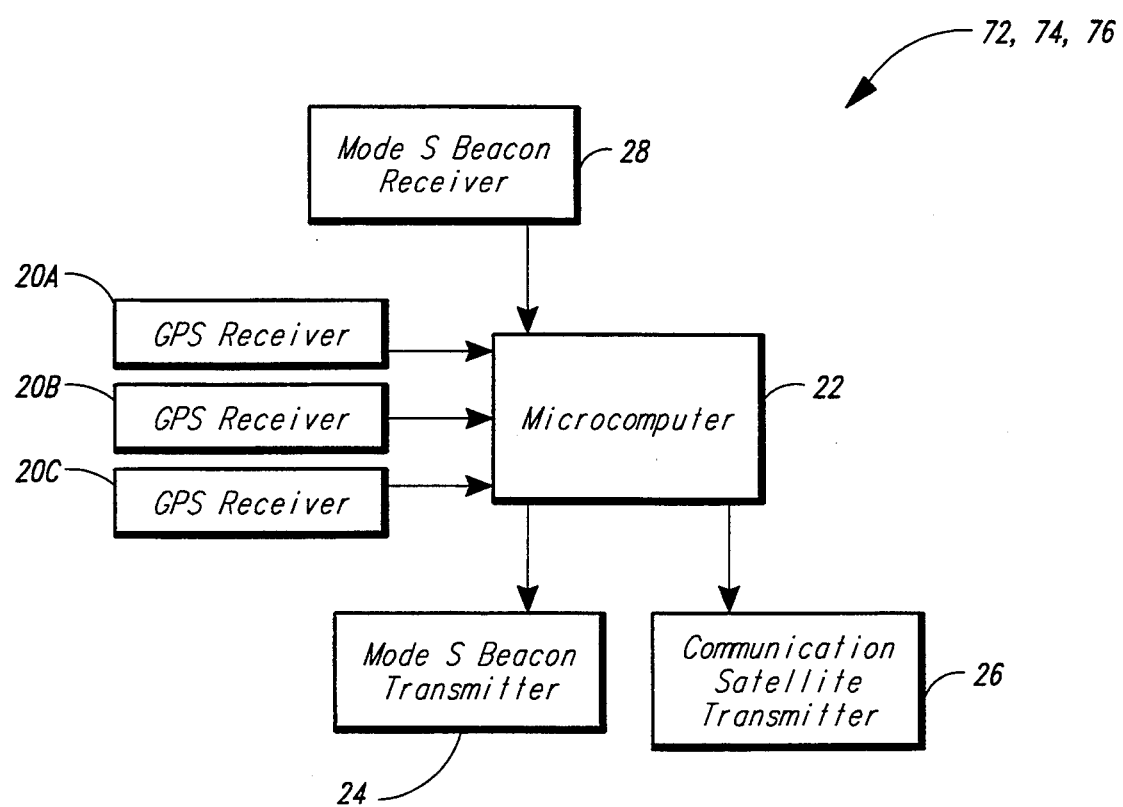
FIG. 10 is a block diagram of a ground station employed in the system shown in FIG. 9.

Each ground station 72-76 is substantially similar to the vehicle location and collision avoidance system of FIG. 2, as shown in FIG. 10. As such, the items shown in FIG. 10 are discussed herein only to the extent that they differ from the system of FIG. 2.

Each of the ground stations has three multi-channel GPS Receivers 20A–C, each of which is capable of tracking and measuring the pseudo-range to multiple satellites simultaneously. As is known in the art, the pseudo-range refers to the travel time of a GPS signal from a satellite to the ground station multiplied by the speed of light. The travel time is computed by recording the time that the signal arrives at the ground station and subtracting from that recorded time the time at which the signal leaves the satellite, which is included in each GPS signal. The calculated range is referred to as pseudo-range because of errors in the calculated range caused by atmospheric disturbances in the GPS signal.

A microcomputer 22 at each ground station 72–76 allocates visible GPS satellites to three GPS receivers 20 in each ground station. Each GPS receiver is assigned GPS satellites until all visible GPS satellites are assigned, with a maximum of four satellites per GPS receiver. The GPS satellites assigned to each GPS receiver are selected to obtain a good Geometric Dilution Of Precision (GDOP). As is known in the art, the GDOP is a mathematical calculation of the angular dispersion between the GPS satellites selected.

The three GPS receivers 20A–C make pseudo-range measurements (actually travel time measurements and pseudo-range calculations) to each of their assigned satellites simultaneously at a predetermined time known as the GPS epoch, which preferably occurs every six seconds. Each GPS receiver calculates uncorrected position coordinates for the ground station from the calculated pseudo-ranges. Preferably, the GPS receivers used the Earth Centered, Earth Fixed (ECEF) coordinate system to express the position coordinates. The GPS receivers send the position coordinates to the microcomputer 22, which causes the beacon transmitter 24 to transmit the coordinates in a data message, described below, during it's assigned time slot.

Using known astronomical equations, the location of each GPS satellite at each GPS epoch is calculated by the GPS receiver using parameters contained in the navigational data message transmitted by the GPS satellite, the location being known as an ephemeris. Using the known satellite ephemeris $(X_j, Y_j, Z_j)$ and the uncorrected ground station location $(X_i, Y_i, Z_i)$, a pseudo-range $(R_{ij}(+))$ between each GPS satellite (j) and each ground station (i) can be calculated using the following equation 1:

$$R_{ij}(t) = \sqrt{(X_j(t) - X_i)^2 + (Y_j(t) - Y_i)^2 + (Z_j(t) - Z_i)^2} \quad (1)$$

The uncorrected position coordinates contained in the data message of each ground station (i) are derived by each GPS Receiver 20A–C as the simultaneous solution to a system of equations, with one equation according to equation 1 for each GPS satellite assigned to the GPS receiver. Since the solution is common to all the equations, it therefore is a solution to each single equation.

The data message sent by the beacon transmitter 24 changes with each successive time slot for each ground station 72–76. A first data message includes an identification address of the ground station, the uncorrected position coordinates of the ground station calculated by the first GPS receiver 20A, Pseudo-Random Noise (PRN) code numbers of the four satellites assigned to the first GPS receiver 20, and the epoch time at which the pseudo-range measurements to each satellite were made. The microcomputer 22 then causes the beacon transmitter 24 to transmit a second data message during the next assigned time slot for the ground station. The second data message includes the ground station's identification address, the uncorrected position coordinates of the ground station calculated by the second GPS Receiver 20B, the PRN code numbers of the four satellites assigned to the second GPS Receiver 20B; and the epoch time at which the pseudo-range measurements to each satellite were made. The microcomputer 22 then causes the beacon transmitter 24 to transmit a third data message during the next assigned time slot for the ground station. The third data message includes the ground station's address, the uncorrected position coordinates of the ground station calculated by the third GPS Receiver 20C, the PRN code numbers of the satellites used by the third GPS Receiver 20C, and the epoch time at which the pseudo-range measurements to each satellite were made.

The sequence of data messages requires three time slots for each ground station 72–76. Preferably, the sequence repeats using the same data that was transmitted in the previous sequence. Thus, each receiving aircraft has two opportunities to receive position data from each ground station based on all satellites, taken four at a time. The two sequences require 6 time slots, or six seconds, at which time a new GPS epoch occurs. At each GPS epoch, new simultaneous pseudo-range and uncorrected position coordinate calculations are made as described above, and the sequences are repeated using the new uncorrected position coordinates.

The events described above occur at each ground station 72–76 for each GPS epoch. Thus, the uncorrected position coordinates for each ground station are available to each receiving aircraft based on every satellite in view. Any one of the ground stations provides all of the data needed to calculate pseudo-range corrections as explained below. All three are included in the system to extend the range at which GPS correction factors are available.

An aircraft 80 receives the data messages from each ground station 72–76 and uses the information in the data message to calculate the GPS correction factor that is used to adjust the GPS-derived aircraft location discussed above with respect to the first through fourth embodiments. The aircraft microcomputer 22 begins the GPS correction factor calculation by recalculating the pseudo-range for each visible GPS satellite using the uncorrected position coordinates for each ground station and the ephemeris of each satellite plugged in to equation 1. To ensure that the correct ephemeris is available, the aircraft microcomputer 22 and the microcomputer 22 in each ground station 72–76 maintain a running history table of epoch time and associated ephemeris for each GPS satellite, for the current epoch and three preceding epochs. As each new epoch occurs, the epoch and it's associated ephemeris for each GPS satellite, obtained from the GPS navigation data message, are placed at the top of the table and each preceding epoch and it's associated ephemeris for each GPS satellite are moved down in the table. The oldest epoch and it's associated ephemerides are eliminated.

A similar analysis can be made to determine an actual range between each ground station 72–76 and the GPS satellites 82 assigned to the ground station using precisely surveyed and accurately known position coordinates of each ground station 72–76. Rather than broadcasting the position coordinates of the ground stations to each aircraft 80, the position coordinates are aggregated into a table of coordinates and stored in a non-volatile memory, such as an EPROM, of every microcomputer 22 employing this method. The microcomputer 22 of the aircraft 80 uses the surveyed position coordinates of each ground station (si) and the ephemerides of the satellites (j) assigned to the ground station to compute the actual ranges $(R_{sij})$ using the following equation 2:

$$R_{sij}(t) = \sqrt{(X_j(t) - X_{si})^2 + (Y_j(t) - Y_{si})^2 + (Z_j(t) - Z_{si})^2} \quad (2)$$

Equation 2 is used to compute the actual range of each satellite assigned to each ground station.

The difference between the calculated pseudo-range and the calculated actual range from the ground station to each of the satellites is the GPS correction factor applicable to the pseudo-range for any aircraft in the vicinity of the ground stations 72-76. The GPS correction factor can be determined by the following equation 3:

$$\text{GPS correction factor} = R_{sij}(t) - R_{ij}(t) \quad (3)$$

In the computations above, for each ground station i, j=1 to n, where n equals the number of visible satellites.

The beacon receiver 28 (FIG. 2) of each receiving aircraft 80 receives the data messages from each ground station 72-76, transmitted during the ground station's assigned time slot by the ground station's beacon transmitter 24. When data messages for all satellites in view have been received and passed to the aircraft's microcomputer 22, the GPS correction factor for each visible satellite is calculated as described above. Thus, all vehicles receiving the data messages of any one of the ground stations have all the data needed to make differential corrections to pseudo-ranges calculated for the vehicles and each satellite in view. Each vehicle need only to select the GPS correction factors applicable to the satellites being used by it's GPS Receiver 20, which are identified by the PRN code numbers broadcast in each ground station data message.

Next is a description of how the method of the fifth embodiment provides guidance to an aircraft 80 making an approach to an airport 78, when the aircraft is within the transmission range of all three ground stations 72-76. Each aircraft on approach receives the transmitted data messages from each ground station 72-76 via the aircraft's beacon receiver 28. The beacon receiver passes the data messages to the aircraft's microcomputer 22, which identifies each of the ground stations by its identification address in the data messages. The microcomputer uses the identification address to select precisely surveyed coordinates of the identified ground station from its non-volatile memory. The microcomputer marks and stores the time of reception of each data message using GPS time supplied by the aircraft's GPS receiver 20.

The receiving aircraft's microcomputer 22 computes the time of transmission of the data messages from each of the ground stations by determining the time slot during which the transmission occurred. The microcomputer determines the ground station's time slot by identifying the grid segment and the relative position in the grid segment in which the stored surveyed coordinates of the ground station are located. Such a determination is identical to that made by each ground station in determining the correct time slot in which to transmit its data messages. The time slot determination are accomplished as described above in the first through fourth embodiments.

The receiving aircraft's microcomputer 22 computes the transit time between the receiving aircraft and each transmitting ground station 72-76 by subtracting the computed time of data transmission from the stored time of data reception, and scales the result by the speed of light. This produces a range from the aircraft 80 to each of the three ground stations. Each range is expressed in equation form in terms of the three known position coordinates of the ground station to which the range applies and the three unknown position coordinates of the receiving aircraft. This produces three range equations containing three unknowns. The aircraft microcomputer 22 solves the three equations simultaneously to determine the receiving aircraft's position in three dimensional space. The position coordinates are used to display and update the aircraft's position during the approach. New solutions for the aircraft's position updates occur repetitively at the system scan rate.

The approach method described herein provides superior accuracy to aircraft on approaches than does the GPS. Since the position coordinates of the three ground stations are very accurately known, the position coordinates of the receiving aircraft derived by this method are not affected by inaccurate satellite vehicle ephemerides, nor by the truncation of ephemeris data employed while accuracy degradation, called selective availability, is being imposed by the military. The effect of clock dithering, also imposed by the military for the same purpose, is eliminated by the pseudo-range corrections calculated as described above.

As is known in the art, the ellipsoid coordinate system associated with WGS-84 has the same origin as the Earth Centered, Earth Fixed (ECEF) cartesian coordinates of WGS-84, except that altitude (Z) dimension of the ECEF System begins at the center of the Earth while the altitude dimension of the ellipsoid system begins at sea level. As a result, transformation between the two systems is easily accomplished. In fact, GPS receivers provide position output in ellipsoidal coordinates, that is, latitude, longitude, and altitude, even though the position computations take place in (ECEF) cartesian coordinates. Thus, both types of coordinates are available from each GPS receiver.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. A target vehicle location method for locating a target vehicle, comprising:
   dividing a predetermined area into grid segments having predetermined dimensions in latitude and longitude;
   assigning a reference waypoint to each grid segment at a predetermined location within the grid segment:
   generating a synthetic latitude function, time mapped onto each grid segment in accordance with a predetermined time period and sequence;
   generating a synthetic longitude function, time mapped onto each grid segment in accordance with a predetermined time period and sequence, the synthetic latitude and longitude functions together defining a plurality of time slots for each grid segment;
   providing the target vehicle with global position information indicating a position of the target vehicle ill latitude and longitude coordinates;

converting the global position information to relative position with respect to the reference waypoint of the grid segment in which the target vehicle is located;

assigning a time slot from the plurality of time slots for the target vehicle based upon the target vehicle's relative position within the grid segment in which it is located; and transmitting, during the assigned time slot, a data message containing information indicative of the target vehicle's position.

2. The method of claim 1 wherein the target vehicle is an aircraft having an altitude and the transmitting step includes transmitting a data message containing information indicative of the altitude of the target aircraft.

3. The method of claim 1 wherein the target vehicle is an aircraft with an altitude, the method further comprising:

generating a synthetic altitude function, time mapped onto each grid segment in accordance with a predetermined time period and sequence, the synthetic latitude, longitude, and altitude functions together defining a plurality of time slots for each grid segment, and each time slot corresponds to a three dimensional position within the grid segment.

4. The method of claim 1, further comprising:
receiving at a parent vehicle the data message transmitted by the target vehicle; and
displaying at the parent vehicle the position of the target vehicle if the target vehicle is within a predetermined range from the parent vehicle.

5. The method of claim 4, further comprising:
monitoring at the parent vehicle the range of the target vehicle from the parent vehicle; and
providing a warning indication if a the range of the target vehicle from the parent vehicle is within a predetermined minimum range.

6. The method of claim 5, wherein the step of providing a warning indication includes displaying the range of the target vehicle and a bearing that indicates a direction in which the target vehicle is traveling.

7. The method of claim 1, further comprising:
receiving at a fixed ground control station the data message transmitted by the target vehicle; and
displaying at the fixed ground control station the position of target vehicle if the target vehicle is within a predetermined range from the fixed ground control station.

8. The method of claim 1 wherein the transmitting step includes transmitting the data message using a communications satellite transmitter that transmits data messages via a communication satellite.

9. The method of claim 8, further comprising:
receiving the data message at a fixed ground control station via the communication satellite; and
displaying at the fixed ground control station the position of target vehicle if the target vehicle is within a predetermined range from the fixed ground control station.

10. The method of claim 8 wherein the predetermined area includes a plurality of air traffic control areas and the transmitting step includes transmitting the data message using a discrete channel that is unique to the air traffic control area in which the target aircraft is located.

11. The method of claim 1 wherein the target vehicle is of a first vehicle type and an additional target vehicle is of a second vehicle type, the method further comprising:

transmitting from the additional target vehicle a data message containing information indicative of a position of the additional target vehicle, the data message transmitted by the additional target vehicle being transmitted over a discrete channel that is different from a discrete channel over which the target vehicle transmits the target vehicle's data message.

12. (Amended) A vehicle location method for locating a target vehicle, comprising:

providing global position information indicative of a position of the target vehicle in latitude and longitude coordinates;

converting the global position information to a relative position with respect to a reference waypoint;

assigning the target vehicle a time slot based on the target vehicle's relative position; and transmitting the target vehicle's global position information beginning at a predetermined time within the target vehicle's assigned time slot.

13. The method of claim 12 wherein the target vehicle is an aircraft having an altitude, the assigning step includes assigning the time slot based on the aircraft's relative latitude, longitude, and altitude with respect to the reference waypoint, and the transmitting step includes transmitting a data message containing information indicative of the altitude of the target aircraft.

14. The method of claim 12, further comprising:
receiving at a parent vehicle the data message transmitted by the target vehicle; and
displaying at the parent vehicle the position of target vehicle if the target vehicle is within a predetermined range from the parent vehicle.

15. The method of claim 14, further comprising:
monitoring at the parent vehicle the range of the target vehicle from the parent vehicle; and
providing a wanting indication if a the range of the target vehicle from the parent vehicle is within a predetermined minimum range.

16. The method of claim 15, wherein the step of providing a warning indication includes displaying the range of the target vehicle and a bearing that indicates a direction in which the target vehicle is traveling.

17. The method of claim 12, further comprising:
receiving at a fixed ground control station the data message transmitted by the target vehicle; and
displaying at the fixed ground control station the position of target vehicle if the target vehicle is within a predetermined range from the fixed ground control station.

18. The method of claim 12 wherein the transmitting step includes transmitting the data message using a communications satellite transmitter adapted to transmit data messages via a communication satellite.

19. The method of claim 18 further comprising:
receiving the data message at a fixed ground control station via the communication satellite; and
displaying at the fixed ground control station the position of target vehicle if the target vehicle is within a predetermined range from the fixed ground control station.

20. The method of claim 12 wherein the predetermined area includes a plurality of air traffic control areas and the transmitting step includes transmitting the data message using a discrete channel that is unique to the air traffic control area in which the target aircraft is located.

21. The method of claim 12 wherein the target vehicle is of a first vehicle type and an additional target vehicle is of a second vehicle type, the method further comprising:
   transmitting from the additional target vehicle a data message containing information indicative of a position of the additional target vehicle, the data message transmitted by the additional target vehicle being transmitted over a discrete channel that is different from a discrete channel over which the target vehicle transmits the target vehicle's data message.

22. The method according to claim 12 wherein the providing step includes:
   calculating a GPS correction factor for a GPS satellite;
   calculating a vehicle pseudo-range from the target vehicle to the GPS satellite;
   adjusting the vehicle pseudo-range by the GPS correction factor for the GPS satellite, thereby obtaining an actual vehicle range; and
   determining the position of the target vehicle in latitude and longitude coordinates based on the actual vehicle range.

23. The method according to claim 22 wherein the step of calculating a GPS correction factor further includes:
   calculating a ground station pseudo-range from a fixed ground station to the GPS satellite;
   calculating a ground station actual range indicative of a difference between surveyed coordinates of the ground station and an ephemeris of the satellite; and
   determining the GPS correction factor for the satellite based on a difference between the ground station pseudo-range and the ground station actual range.

24. The method according to claim 12 further including:
   calculating a ground station pseudo-range for each of a plurality of GPS satellites visible from a fixed ground station, each ground station pseudo-range being indicative of a distance from the ground station to a different one of the visible GPS satellites;
   calculating a ground station actual range for each of the plurality of visible GPS satellites, each ground station actual range being indicative of a difference between surveyed coordinates of the ground station and an ephemeris of a different one of the GPS satellites; and
   determining a GPS correction factor for each of the visible GPS satellites based on a difference between the ground station pseudo-range and the ground station actual range for the GPS satellite.

25. The method according to claim 12 wherein the providing step includes:
   receiving surveyed position coordinates of three ground stations at the target vehicle;
   transmitting a data message from each of the ground stations based on the relative position of the ground station with respect to the reference waypoint;
   receiving at the target vehicle each data message and recording the time at which the data message is received;
   calculating a travel time for each ground station, the travel time representing the length of time that the data message took to get from the ground station to the target vehicle; and
   determining a range from the each ground station to the target vehicle by scaling each travel time by the speed of light.

26. The method according to claim 25 wherein the providing step further includes:
   calculating three-dimensional position coordinates of the target vehicle based on the range and surveyed position coordinates of each ground station.

27. A vehicle location system for locating a target vehicle, comprising:
   a receiver aboard the target vehicle that receives global position information indicative of a position of the target vehicle in latitude and longitude coordinates;
   means for dividing a predetermined area into a plurality of grid segments having predetermined dimensions in latitude and longitude, each grid segment having a reference waypoint, the target vehicle being positioned in one of the grid segments;
   means for converting the global position information to a relative position with respect to the reference waypoint of the grid segment in which the target vehicle is located;
   means for assigning the target vehicle a time slot based on the target vehicle's relative position; and
   a transmitter that transmits the target vehicle's global position information during the target vehicle's assigned time slot.

28. The vehicle location system of claim 27 wherein the target vehicle is an aircraft having an altitude, the relative position upon which the time slot is based includes the altitude of the aircraft, and the transmitter is adapted to transmit a data message containing information indicative of the altitude of the target aircraft.

29. The vehicle location system of claim 27, further comprising:
   a receiver at a parent vehicle, the receiver being adapted to receive the data message transmitted by the target vehicle; and
   a display at the parent vehicle, the display being adapted to display the position of target vehicle if the target vehicle is within a predetermined range from the parent vehicle.

30. The vehicle location system of claim 29, further comprising:
   means for monitoring at the parent vehicle the range of the target vehicle from the parent vehicle; and
   means for providing a warning indication if a the range of the target vehicle from the parent vehicle is within a predetermined minimum range.

31. The vehicle location system of claim 27, further comprising:
   a receiver at a fixed ground control station, the receiver being adapted to receive the data message transmitted by the target vehicle; and
   a display at the fixed ground control station, the display being adapted to display the position of target vehicle if the target vehicle is within a predetermined range from the fixed ground control station.

32. The vehicle location system of claim 27 wherein the transmitter includes a communications satellite transmitter adapted to transmit data messages via a communication satellite.

33. The vehicle location system of claim 32, further comprising:
- a satellite receiver at a fixed ground control station, the satellite receiver being adapted to receive the data messages via the communication satellite; and
- a display at the fixed ground control station, the display being adapted to receive the position of target vehicle if the target vehicle is within a predetermined range from the fixed ground control station.

34. A vehicle location system whereby position data regarding a target aircraft located on an airport surface are made available to other aircraft and to an airport traffic control tower by transmitting a data message containing position coordinates of the aircraft, during a uniquely defined time slot, comprising:
- means for dividing the airport surface into grid segments having predetermined dimensions in latitude and longitude;
- means for assigning a reference waypoint to each grid segment at a predetermined location within the grid segment;
- means aboard the target aircraft for generating a synthetic latitude function time mapped onto the grid segment within which the target aircraft is located in accordance with a predetermined time period and sequence;
- means aboard the target aircraft for generating a synthetic longitude function time mapped onto the grid segment within which the target aircraft is located in accordance with a predetermined time period and sequence, the synthetic latitude and longitude functions together defining a plurality of time slots;
- means for assigning the target aircraft a time slot based on the relative position of the aircraft with respect to the reference waypoint for the grid segment in which the target aircraft is located; and
- a transmitter aboard the target aircraft, the transmitter being adapted to transmit the data message during the assigned time slot.

35. The vehicle location system of claim 34, further comprising:
- a receiver at a parent aircraft, the receiver being adapted to receive the data message transmitted by the target vehicle; and
- a display at the parent vehicle, the display being adapted to display the position of target vehicle if the target vehicle is within a predetermined range from the parent vehicle.

36. The vehicle location system of claim 34, further comprising:
- a receiver at the airport traffic control tower, the receiver being adapted to receive the data message transmitted by the target vehicle; and
- a display at the airport traffic control tower, the display being adapted to display the position of target vehicle if the target vehicle is within a predetermined range from the fixed ground control station.

37. A vehicle location method of locating a target vehicle, comprising:
- receiving at the target vehicle from a fixed ground station uncorrected position coordinates of the ground station, the uncorrected position coordinates being determined by the fixed ground station based on GPS signals received from a plurality of GPS satellites visible from the fixed ground station;
- calculating a ground station pseudo-range for each of the plurality of GPS satellites visible from a fixed ground station using the uncorrected position coordinates, each ground station pseudo-range being indicative of a distance from the fixed ground station to a different one of the visible GPS satellites;
- calculating a ground station actual range for each of the plurality of visible GPS satellites, each ground station actual range being indicative of a difference between surveyed coordinates of the ground station and an ephemeris of a different one of the GPS satellites;
- determining a GPS correction factor for each of the visible GPS satellites based on a difference between the ground station pseudo-range and the ground station actual range for the GPS satellite;
- calculating a vehicle pseudo-range from the target vehicle to a selected one of the GPS satellites;
- adjusting the vehicle pseudo-range by the GPS correction factor for the selected GPS satellite, thereby obtaining an actual vehicle range; and
- determining the position of the target vehicle in latitude and longitude coordinates based on the actual vehicle range.

* * * * *

UNITED STATES PATENT AND TRADEMARK OFFICE
CERTIFICATE OF CORRECTION

PATENT NO. : 5,450,329
DATED : September 12, 1995
INVENTOR(S) : Jesse H. Tanner

It is certified that error appears in the above-indentified patent and that said Letters Patent is hereby corrected as shown below:

In column 22, claim 12, line 11, delete "(Amended)".

Signed and Sealed this

Ninth Day of January, 1996

Attest:

BRUCE LEHMAN

*Attesting Officer*  *Commissioner of Patents and Trademarks*